United States Patent [19]

Dai et al.

[11] Patent Number: 5,416,054
[45] Date of Patent: May 16, 1995

[54] HYDROCONVERSION CATALYST WITH SPECIFIED PORE SIZE DISTRIBUTION

[75] Inventors: Pei-Shing E. Dai, Port Arthur; Gerald V. Nelson, Nederland; Govanon Nongbri; Roy E. Pratt, both of Port Neches; David E. Sherwood, Jr., Beaumont, all of Tex.

[73] Assignee: Texaco Inc., White Plains, N.Y.

[21] Appl. No.: 77,807

[22] Filed: Feb. 25, 1993

Related U.S. Application Data

[62] Division of Ser. No. 870,970, Apr. 20, 1992.

[51] Int. Cl.⁶ ............... B01J 27/19; B01J 27/188; B01J 27/18
[52] U.S. Cl. ................... 502/211; 502/210; 502/313; 502/314; 502/315
[58] Field of Search ............... 502/211, 210, 313, 315, 502/314

[56] References Cited

U.S. PATENT DOCUMENTS

| | | | |
|---|---|---|---|
| 4,278,566 | 7/1981 | Hensley, Jr. et al. | 502/313 |
| 4,395,329 | 7/1983 | Le Page et al. | 502/211 |
| 4,738,944 | 4/1988 | Robinson et al. | 502/211 |
| 4,941,964 | 7/1990 | Dai et al. | 208/216 PP |
| 5,047,142 | 9/1991 | Sherwood, Jr. et al. | 208/251 H |

Primary Examiner—Paul E. Konopka
Attorney, Agent, or Firm—Kenneth R. Priem; Cynthia L. Hunter; Walter D. Hunter

[57] ABSTRACT

Heavy oils may be hydrotreated in the presence of a porous alumina support bearing metals of Group VIII and VI-B and optionally phosphorus, the catalyst having a Total Surface Area of 165–230 m²/g, a Total Pore Volume of 0.5–0.8 cc.g, and a Pore Diameter Distribution whereby less than about 5% the Total Pore Volume is present as primary micropores of diameter less than 80 Å, and secondary micropores of diameter of +20 Å of a Pore Mode of 100–135 Å are present in amount of at least about 65% of the micropore volume having pores with diameter less than 250 Å, and 22–29% of the Total Pore Volume is present as macropores of diameter >250 Å.

The process of the instant invention is particularly effective in achieving desired levels of hydrodemetallation, hydrodesulfurization, and hydrocracking of asphaltenes in the fraction of hydrotreated/hydrocracked petroleum resid product having a boiling point greater than 1000° F.

5 Claims, No Drawings

HYDROCONVERSION CATALYST WITH SPECIFIED PORE SIZE DISTRIBUTION

This is a division of application Ser. No. 07/870,970, filed 20 Apr. 1992.

FIELD OF THE INVENTION

This invention relates a process for hydrotreating a hydrocarbon feed. More particularly it relates to a hydroconverison process employing catalyst with a specified pore size distribution.

BACKGROUND OF THE INVENTION

As is well known to those skilled in the art, it is desired to convert heavy hydrocarbons, such as those having a boiling point above about 1000° F., into lighter hydrocarbons which are characterized by higher economic value. It is also desirable to treat hydrocarbon feedstocks, particularly petroleum residues, to achieve other goals including hydrodesulfurization (HDS), hydrodenitrification (HDN), carbon residue reduction (CRR), and hydrodemetallation (HDM)—the latter particularly including removal of nickel compounds (HDNi) and vanadium compounds (HDV).

These processes typically employ hydrotreating catalysts with specified ranges of pores having relatively small diameters (i.e. micropores, herein defined as pores having diameters less than 250 Å) and pores having relatively large diameters (i.e. macropores, herein defined as pores having diameters greater than 250 Å)

U.S. patent application Ser. No. 194,379 (Dai et al., filed May 13, 1988) now U.S. Pat. No. 5,047,142 discloses a catalyst composition useful in the hydroprocessing of a sulfur- and metal-containing feedstock comprising an oxide of nickel or cobalt and an oxide of molybdenum on a porous alumina support in such a manner that the molybdenum gradient of the catalyst has value of less than 6.0 and 15–30% of the nickel or cobalt is in an acid extractable form, and having a surface area of 150–210 m$^2$/g, a Total Pore Volume (TPV) of 0.50–0.75 cc/g, and a pore size distribution such that less than 25% TPV is in pores having diameters of less than 100 Å, 70.0–85.0% TPV is in pores having diameters of 100 Å–160 Å and 1.0–15.0% TPV is in pores having diameters of greater than 250 Å.

U.S. patent application Ser. No. 168,095 now U.S. Pat. No. 4,941,964 (Dai et al., filed Mar. 14, 1988) discloses a process for the hydrotreatment of a sulfur- and metal-containing feed which comprises contacting said feed with hydrogen and a catalyst in a manner such that the catalyst is maintained at isothermal conditions and is exposed to a uniform quality of feed, the catalyst comprising an oxide of a Group VIII metal, an oxide of a Group VI-B metal and 0–2.0 weight % of an oxide of phosphorus on a porous alumina support, and having a surface area of 150–210 m$^2$/g and a Total Pore Volume (TPV) of 0.50–0.75 cc/g such that 70–85% TPV is in pores having diameters of 100 Å–160 Å and 5.5–22.0% TPV is in pores having diameters of greater than 250 Å.

U.S. Pat. No. 4,738,944 (Robinson et al.) discloses a catalyst composition useful in the hydrotreatment of hydrocarbon oils, the catalyst containing nickel and phosphorus and about 19–21.5% Mo (calculated as the oxide) on a porous refractory oxide, having a narrow pore size distribution wherein at least 10% TPV is in pores having diameters less than 70 Å, at least 75% TPV is in pores having diameters between 50–110 Å, at least 60% TPV is in pores having diameters within Group VIII metal or combinations thereof) on a porous support, the catalyst being further characterized by having a TPV of 0.5–1.1 cc/g with at least 70% TPV in pores having diameters of 80–150 Å and less than 3% TPV in pores having diameters greater than 1000 Å.

U.S. Pat. No. 4,328,127 (Angevine et al.) discloses a catalyst composition for use in the hydrodemetallation-desulfurization of residual petroleum oils, the catalyst comprising a hydrogenating component (i.e. Group VI-B or Group VIII metal, or combinations thereof) on a porous support, and being further characterized by having a TPV of 0.45–1.5 cc/g with 40–75% TPV in pores having diameters of 150–200 Å, and up to 5% TPV in pores having diameters of greater than 500 Å.

U.S. Pat. No. 4,309,278 (Sawyer) discloses a process for the hydroconversion of a hydrocarbon feedstock comprising contacting the feedstock with hydrogen and a catalyst in a fixed bed, moving bed, ebullating bed, slurry, disperse phase, or fluidized bed reactor, where the catalyst comprises a hydrogenation component (i.e. Group VI-B or Group VIII metal) on a porous support, and is further characterized by having a TPV of 1.0–2.5 cc/g with no more than 0.05–0.20 cc/g of TPV in pores having diameters of greater than 400 Å.

U.S. Pat. No. 4,305,965 (Hensley, Jr. et al.) discloses a process for the hydrotreatment of a hydrocarbon stream comprising contacting the stream with hydrogen and a catalyst, the catalyst comprising chromium, molybdenum, and at least one Group VIII metal on a porous support, and further characterized by having a TPV of 0.4–0.8 cc/g with 0–50% TPV in pores having diameters smaller than 50 Å, 30–80% TPV in pores having diameters of 50–100 Å, 0–50% TPV in pores having diameters of 100–150 Å, and 0–20% TPV in pores having diameters greater than 50 Å.

U.S. Pat. No. 4,297,242 (Hensley, Jr. et al.) discloses a 2-stage process for the catalytic hydrotreatment of hydrocarbon streams containing metal and sulfur compounds, the process comprising: (i) first contacting the feedstock with hydrogen and a demetallation catalyst comprising a Group VI-B and/or Group VIII metal; and (ii) thereafter reacting the effluent with a catalyst consisting essentially of at least one Group VI-B metal on a porous support, and having a TPV of 0.4–0.9 cc/g and a pore size distribution such that pores having diameters of 50–80 Å constitute less than 40% TPV, pores having diameters of 80–100 Å constitute 15–65% TPV, pores having diameters of 100 130 Å constitute 10–50% TPV, and pores having diameters of greater than 130 Å less than 15% TPV.

U.S. Pat. No. 4,089,774 (Oleck et al.) discloses a process for the demetallation and desulfurization of a hydrocarbon oil comprising contacting the oil with hydrogen and a catalyst, the catalyst comprising a Group VI-B metal and an iron group metal (i.e. iron, cobalt, or nickel) on a porous support, and having a surface area of 125–210 m$^2$/g and TPV of 0.4–0.65 cc/g with at least 10% TPV in pores having diameters less than 30 Å, at least 50% of pore volume accessible to mercury being in pores having diameters of 30–150 Å, and at least 16.6% of pores accessible to mercury being in pores having diameters greater than 300 Å.

U.S. Pat. No. 4,082,695 (Rosinski et al.) discloses a catalyst for use in the demetallation and desulfurization of petroleum oils, the catalyst comprising a hydrogenating component (i.e. cobalt and molybdenum) on a porous support, and having a surface area of 110–150 m$^2$/g and a pore size distribution such that at least 60% a TPV is in pores having diameters of 100–200 Å and not less than 5% TPV is in pores having diameters greater than 500 Å.

U.S. Pat. No. 4,066,574 (Tamm) discloses a catalyst composition useful in the hydrodesulfurization of a hydrocarbon feedstock containing organometallic compounds, the catalyst comprising Group VI-B and Group VIII metal components on a porous support, and having a TPV of 0.5–1.1 cc/g with a pore diameter distribution such that at least 70% TPV is in pores of diameters of 80–150 Å and less than 3% TPV is in pores having diameters greater than 1000 Å.

U.S. Pat. No. 4,051,021 (Hamner) discloses a catalytic process for the hydrodesulfurization of a hydrocarbon feed which comprises contacting the feed with hydrogen and a catalyst, the catalyst comprising a Group VI-B and Group VIII metal on a porous support, and having a TPV of 0.3–1.0 cc/g with a pore diameter distribution such that greater than 50% TPV is in pores of diameters of 70–160 Å, and pores having diameters below 70 Å and above 160 Å are minimized.

U.S. Pat. No. 4,048,060 (Riley) discloses a two-stage process for hydrodesulfurizing a heavy hydrocarbon feed which comprises: (i) contacting the feed with hydrogen and a first catalyst to produce a first hydrodesulfurized hydrocarbon product, the first catalyst comprising a Group VI-B and Group VIII metal on a porous support and having a mean pore diameter of 30–60 Å; and (ii) contacting the first hydrodesulfurized hydrocarbon product with hydrogen and a second catalyst under hydrodesulfurization conditions, the second catalyst comprising a Group VI-B and Group VIII metal on a porous support and being further characterized by having a TPV of 0.45–1.50 cc/g with 0.–0.5 cc/g of TPV in pores having diameters greater than 200 Å, 0–0.05 cc/g of TPV in pores having diameters below 120 Å, and at least 75% TPV in pores having diameters ±10 Å of a mean pore diameter of 140–190 Å.

U.S. Pat. No. 3,876,523 (Rosinski et al.) discloses a process for the demetallizing and desulfurizing of residual petroleum oil comprising contacting the oil with hydrogen and a catalyst, the catalyst comprising a Group VI-B and Group VIII metal on a porous support and having a pore size distribution such that greater than 60% TPV is in pores of diameters of 100–200 Å, at least 5% TPV is in pores having diameters greater than 500 Å, and 10% TPV or less is in pores having diameters less than 40 Å, and the surface area of the catalyst is 40–150 m$^2$/g.

U.S. Pat. No. 3,770,617 (Riley et al.) discloses a process for the desulfurization of a petroleum hydrocarbon feed comprising contacting the feed with hydrogen and a catalyst, the catalyst comprising a Group VI-B or Group VIII metal on a porous support and having greater than 50% TPV in pores of 30–80 Å, less than 4% TPV in pores having diameters 200–2000 Å, and at least 3% TPV in pores having diameters greater than 2000 Å.

U.S. Pat. No. 3,692,698 (Riley et al.) discloses a catalyst useful in hydroprocessing of heavy feed stocks, the catalyst comprising a mixture of Group VI-B and Group VIII metals on a porous support and having a pore size distribution such that a major portion of its TPV is in pores of diameters ranging from 30–80 Å, less than 4% TPV is in pores of diameters of 200–2000 Å, and at least 3% TPV is in pores of diameters greater than 2000 Å.

Early petroleum distillate hydrotreating catalysts generally were monomodal catalysts with very small micropore diameters (less than say 100 Å) and rather broad pore size distributions. First generation petroleum resid hydro-treating catalysts were developed by introducing a large amount of macroporosity into a distillate hydrotreating catalyst pore structure to overcome the diffusion resistance of large molecules. Such catalysts, which are considered fully bimodal HDS/HDM catalysts, are typified by U.S. Pat. Nos. 4,395,328 and 4,089,774 supra.

Another approach to developing improved catalysts for petroleum resid processing has involved enlarging the micropore diameters of essentially monomodal catalysts (having no significant macroporosities) to overcome the above described diffusion limitations. Essentially monomodal catalysts with small micropore diameters and low macroporosities designed for improved petroleum resid HDS include those disclosed in U.S. Pat. Nos. 4,738,944; 4,652,545; 4,341,625; 4,309,378; 4,306,965; 4,297,242; 4,066,574; 4,051,021; 4,048,060 (1st stage catalyst); 3,770,617; and 3,692,698, supra. Essentially monomodal catalysts with larger micropore diameters and low macroporosities designed for improved petroleum resid HDM include those disclosed in U.S. Pat. Nos. 4,328,127; 4,309,278; 4,082,695; 4,048,060 (2nd stage catalyst); and 3,876,523, supra.

A recent approach to developing improved catalysts for petroleum resid processing has involved the use of catalysts having micropore diameters intermediate between the above described monomodal HDS and HDM catalysts, as well as sufficient macroporosities so as to overcome the diffusion limitations for petroleum bottoms HDS (i.e., sulfur removal from hydrocarbon product of a hydrotreated petroleum resid having a boiling point greater than 1000° F.) but limited macro-porosities to limit poisoning of the interiors of the catalyst particles. Catalysts, with micropore diameters intermediate between the above-described monomodal HDS and HDM catalysts with limited macroporosities include those of U.S. patent application Ser. Nos. 168,095 (now U.S. Pat. No. 4,941,964); and 194,378 (now U.S. Pat. No. 5,047,142) supra.

However, none of the above-identified catalyst types has been found to be effective for achieving desired levels of hydroconverison of feedstocks components having a boiling point greater than 1000° F. to products having a boiling point less than 1000° F. while simultaneously yielding a 1000° F.+ product having a lower sulfur content.

It is an object of this invention to provide a process for hydrotreating a charge hydrocarbon feed. Other objects will be apparent to those skilled in the art.

STATEMENT OF THE INVENTION

In accordance with certain of its aspects, this invention is directed to a process for hydrotreating a charge hydrocarbon feed containing components boiling above 1000° F., sulfur, metals, and asphaltenes which comprises contacting said charge hydrocarbon feed with hydrogen at isothermal hydrotreating conditions in the presence of, as catalyst, a porous alumina support bearing 3–6 w % of a Group VIII metal oxide, 14.5–24 w % of a Group VI-B metal oxide, and 0–6 w % of a phosphorous oxide, said catalyst having a Total Surface Area of 165–230 m$^2$/g, a Total Pore Volume TPV of 0.5–0.8 cc/g, and a Pore Diameter Distribution whereby less than about 5% of the Total Volume Pore is present as primary micropores of diameter less than about 80 Å and secondary micropores of diameter ±20 Å of a Pore Mode of about 100–135 Å are present in amount of at least about 65% of the micropore volume having pores with diameter less than 250 A, and about 22–29% of the Total Pore Volume is present as macropores of diameter ≧25 A thereby forming hydrotreated product containing decreased contents of components boiling above 1000° F., sulfur, metals, and asphaltenes; and recovering said hydrotreated product containing decreased contents of components boiling about 1000° F., sulfur, metals and asphaltenes.

DESCRIPTION OF THE INVENTION

The charge hydrocarbon feed which may be charged to the process of this invention may include heavy, high boiling petroleum cuts typified by gas oils, vacuum gas oils, petroleum cokes, residual oils, vacuum resid, etc. The process of this invention is particularly useful to treat high boiling oils which contain components boiling above 1000° F. to convert them to products boiling below 1000° F. The charge may be a petroleum fraction having a boiling point of above 650° F. characterized by presence of an undesirably high content of components boiling above 1000° F., metals, sulfur, and asphaltenes.

It is a particular feature of the process of this invention that it may permit treating of hydrocarbon charge, particularly those containing components boiling above about 1000° F., to form product which is characterized by an increased content of components boiling below 1000° F. and by decreased content of undesirable components typified by metals, sulfur, and asphaltenes (herein defined as the quantity of n-heptane-insolubles minus the quantity of toluene-insolubles in the feedstock or product).

A typical charge which may be utilized is an Arabian Medium/Heavy Vacuum Resid having the following properties:

TABLE

| Property | Value |
|---|---|
| API Gravity | 4.8 |
| 1000° F.+, vol % | 87.5 |
| 1000° F.+, w % | 88.5 |
| 1000° F− w % | 11.5 |
| Sulfur, w % | 5.0 |
| Total Nitrogen, wppm | 4480 |
| Hydrogen, w % | 10.27 |
| Carbon, w % | 84.26 |
| Alcor MCR, w % | 22.2 |
| Kinematic Viscosity, cSt | |
| @ 212 F. | 2430 |
| @ 250 F. | 410 |
| @ 300 F. | 117 |
| Pour Point, °F. | 110 |
| n-C$_5$ Insolubles, w % | 28.4 |
| n-C$_7$ Insolubles, w % | 9.96 |
| Toluene Insolubles, w % | 0.02 |
| Asphaltenes, w % | 9.94 |
| Metals, wppm | |
| Ni | 49 |
| V | 134 |
| Fe | 10 |
| Cu | 3 |
| Na | 49 |
| Total Metals wppm | 245 |
| Chloride, wppm | 28 |

In practice of the process of this invention, the charge hydrocarbon feed is contacted with hydrogen at isothermal hydrotreating conditions in the presence of catalyst. Hydrogen is charged at a rate of 2000–10,000 SCFB, preferably 3000–8000, say 7000 SCFB. Temperature of operation is typically 650° F.–850° F., preferably 700° F.–800° F., say 770° F. The operation is essentially isothermal; and the temperature may typically vary throughout the bed by less than about 20° F. Pressure of operation may be 1500–3500 psig, preferably 1800–2500 psig, say 2250 psig.

The catalyst support may be alumina. Although the alumina may be alpha, beta, theta, or gamma alumina, it is preferred to utilize gamma alumina.

The alumina substrate which may be employed yields a finished catalyst which is characterized by Total Surface Area, Total Pore Volume, and Pore Diameter Distribution. The Total Surface Area is 165–230, preferably 195–215, say 209 m$^2$/g. The Total Pore Volume may be 0.5–0.8, preferably 0.73–0.8, say 0.77 cc/g.

The Pore Diameter Distribution is such that less than 5%, preferably 0–3%, say 1.9% of the Total Pore Volume is present as primary micropores of diameter of less than about 80 A.

Secondary micropores of pore diameter which is ±20 Å of a pore mode of 100 Å–135 Å, preferably 105 Å–125 Å, say about 105 Å, are present in amount of ≧65%, preferably 65–70%, say 68% of micropore volume having pores with diameter less than 250 A.

Macropores of diameter of greater than about 250 Å are present in amount of about 22–29%, preferably 25%–29%, say 26% of the Total Pore Volume.

It should be noted that the Pore Size Distribution in the finished catalyst and particularly the percentage of the secondary micropores pores of diameter 100–135 A in the finished catalyst are essentially the same as in the charge alumina from which it is prepared. The Total Surface Area, the Total Pore Volume, and the Pore Volume of the finished catalyst may be 90%–100%, say 97% of the charge alumina from which it is prepared.

The alumina charge may be loaded with metals to yield a product catalyst containing a Group VIII oxide in amount of 3–6 w %, preferably 3–3.5 w %, say 3.2 w % a Group VI-B metal oxide in amount of 14.5–24, preferably 14.5–16.5 w %, say 5.2 w % and a phosphorous oxide (P$_2$O$_5$) in amount of 0–6 w %, preferably 0–0.2, say ≦0.2 w %.

The Group VIII metal may be a non-noble metal such as iron, cobalt, or nickel, or a noble metal such as ruthenium, rhodium, palladium, osmium, iridium, or platinum. This metal may be loaded onto the alumina typically from a 10%–50% aqueous solution of a water-soluble salt (e.g. a nitrate, acetate, oxalate etc.). The preferred metal may be nickel, employed as a 30 w % aqueous solution of nickel nitrate.

The Group VI-B metal may preferably be chromium, molybdenum, or tungsten. This metal may be loaded onto the alumina typically from a 10%–25%, say 15% aqueous solution of a water-soluble salt such as ammonium molybdate.

The phosphorus component, when employed, may be employed as a 20%–90%, say 85 w % aqueous solution of phosphoric acid H$_3$PO$_4$.

These catalyst metals (and phosphorus when present) may be loaded onto the alumina support by immersing the latter in a solution of the former. Although it is preferred to load the metals and phosphorus simultaneously, it is possible to load each separately. When phosphorus is not present, small amounts of $H_2O_2$ may be added to stabilize the impregnating solution. Loading of each metal may be effected by immersing the alumina support in the aqueous solution for 12-36 hours, say 24 hours at 60° F.-100° F., say 80° F. followed by draining, drying at 220° F.-300° F., say 250° F. for 2-10 hours, say 4 hours, and calcining at 900° F.-1200° F., say 1095° F. for 0.5-5 hours, say 0.5 hour.

The so loaded catalyst may preferably be formed into desired shape by casting or extrusion. Preferably the catalyst may be extruded to form cylinders of diameter by 0.035 inch-0.041 inch, say 0.038 inch and length of 0.1-0.5 inch, say 0.15 inch.

In practice of the process of this invention, the catalyst, preferably in the form of extruded cylinders of 0.038 inch diameter and 0.15 inch length may be placed within a reactor. The particle size distribution may be; <0.5 mm-0.5 w % max; <5.0 mm 5 w % max; <1.6 mm 10 w % max; <2.5 mm 40 w % max; and >15 mm 10 w % max. The hydrocarbon charge is admitted to the lower portion of the bed in liquid phase at 650° F.-800° F., preferably 700° F.-800° F., say 770° F. and 1500-3500 psig, preferably 2000-3000 psig, say 2250 psig. Hydrogen gas is admitted with the hydrocarbon charge in amount of 3000-10,000 SCFB, preferably 5000-8000 SCFB, say 7000 SCFB. The hydrocarbon charge passes through the bed at a LHSV of 0.1-3, preferably 0.3-1, say 0.56. During operation, the bed expands to form an ebullated bed with a defined upper level. Operation is essentially isothermal with a typical maximum temperature difference between the inlet and the outlet of 0° F.-50° F., preferably 0° F.-30° F., say 15° F.

In a less preferred embodiment, the reaction may be carried out in one or more continuously stirred tank re-actors (CSTR) which also provides essentially isothermal conditions.

During passage through the reactor, preferably containing an ebullated bed, the hydrocarbon feedstock may be converted to lower boiling products by the hydrotreating reaction. In a typical embodiment, a charge containing 60 w %-95%, say 89 w % boiling above 1000° F. and 0 w %-30 w %, say 12 w % boiling in the 600° F.-1000° F. range may be converted to a hydrotreated product containing only 35 w %-65 w %, say 58 w % boiling above 1000° F. The sulfur of the original charge is typically 5.0 w %; the sulfur content of the unconverted 1000° F.+ component in the product is typically 3.1 w %.

ADVANTAGES OF THE INVENTION

It will be apparent to those skilled in the art that this invention is characterized by advantages including the following:

(i) it permits attainment of yield of hydrocarbon products boiling below 1000° F.;
(ii) it permits operation to yield highly desulfurized hydrocarbon product;
(iii) it permits operation to yield hydrocarbon product characterized by lower content of metals;
(iv) the 650° F.-1000° F. portion of the product is also characterized by a desirably lower content of nitrogen and sulfur;
(v) the 1000° F.+ component of the product is characterized by a significantly lower content of sulfur;
(vi) the 1000 F.+ component of the product is characterized by a significantly lower content of asphaltenes;
(vii) the total liquid product is characterized by a low content of asphaltenes. Thus it would be expected to improve unit operability and to prevent unscheduled shutdowns caused by sediment deposition in the downstream fractionation equipment.

Practice of the process of this invention will be apparent to those skilled in the art from the following wherein all parts are parts by weight unless otherwise stated. Control examples are designated by an asterisk.

DESCRIPTION OF SPECIFIC EMBODIMENTS

EXAMPLE I

In this example which represents the best mode presently known of carrying out the process of this invention, the charge hydrocarbon is the Arabian Medium/-Heavy Vacuum Resid having the properties set forth in the table supra. It should be noted that this charge hydrocarbon is particularly characterized by the presence of 87.5 v % of components having a boiling point above 1000° F., by a sulfur content of 5 w %, and by a total metals content of 245 wppm.

The catalyst is prepared from a commercially available gamma alumina having the properties set forth in the Table which follows which notes the Total Surface Area TSA in square meters per gram of alumina, Total Pore Volume TPV in cubic centimeters per gram, and the Pore Volume PV, as a percent of TPV, arising from pores of noted diameter (A):

TABLE

| Property | Finished Catalyst | Charge Alumina |
|---|---|---|
| TSA m²/g | 197 | 224 |
| TPV cc/g | 0.78 | 0.99 |
| PV % < 100A | 15 | 19 |
| PV % 100A-160A | 53 | 48 |
| PV % < 160A | 68 | 67 |
| PV % > 160A | 32 | 33 |
| PV % > 250A | 26 | 26 |
| PV % 500A-10,000 | 22 | 22 |

This alumina (780 g) in the form of extrudate of diameter of 0.035-0.041 inch is impregnated at 80° F. with 820 ml aqueous solution which contains 122 g of nickel nitrate hexahydrate and 185 g of ammonium molybdate and 40 ml of hydrogen peroxide. The catalyst is dried at 250° F. for 4 hours and calcined at 1095° F. for 30 minutes.

The product catalyst is characterized as follows:

TABLE

| Component | W % |
|---|---|
| MoO₃ | 15.2 |
| NiO | 3.2 |
| SiO₂ | ≦2.5 |
| SO₄ | ≦0.8 |
| Na₂O | ≦0.1 |
| P₂O₅ | <0.2 |

It is also characterized by essentially the same Total Pore Volume, Total surface Area, and Pore Size Distribution percentages as is the charge alumina (note Table supra)—but the Total Surface Area and the Total Pore Volume may decrease somewhat.

The catalyst (100 parts) is extruded to form cylinders of 0.038 inch diameter and 0.15 inch length. The catalyst is dried at 80° F. for 24 hours followed by calcining at 1010° F. for 1 hour. This catalyst is placed within the reaction vessel in which an ebullated bed is to be maintained.

Charge hydrocarbon is admitted in liquid phase at 770° F. and 2250 psig to the ebullated bed at a space velocity LHSV of 0.56. Hydrogen is admitted in amount of 7000 SCFB.

Product is collected and analyzed to yield the following data:

TABLE

| Property | Value |
|---|---|
| % Sulfur Removal | 63 |
| % Carbon Residue Reduction | 45 |
| % Ni Removal | 54 |
| % V Removal | 75 |
| % S In Unconverted 1000° F.+ Fraction | 3.0 |
| % S In 650° F.-1000° F. Fraction | 1.05 |
| % Hydroconversion of 1000° F.+ to 1000° F. - Materials | 40.2 |
| % N In 650° F.-1000° F. Fraction | 0.22 |

Upon distillation to recover (i) a first cut from the initial boiling point to 650° F., (ii) a second cut from 650° F. to 1000° F., and (iii) a third cut above 1000° F., the following is noted:

TABLE
EXAMPLE I

| | Product |
|---|---|
| Cut 1: up to 650° F. | |
| Sp. Gr. | 0.85 |
| Sulfur w % | 0.25 |
| Cut 2: 650° F.-1000° F. | |
| Sp. Gr. | 0.93 |
| Sulfur w % | 1.05 |
| Total N wppm | 2242 |
| Basic N wppm | 812 |
| Cut 3: 1000° F.+ | |
| Sp. Gr. | 1.03 |
| Sulfur w % | 3.07 |

From the above Table, it is apparent that the process of this invention permits increasing the conversion of the materials boiling below 1000° F. up to 40.2 w %. The Sulfur content of the 1000° F.+ fraction is decreased (from 5.0 w % in the feed) down to 3.1 w %.

The metals content is decreased (from 245 wppm) down to 85 wppm.

The process of this invention typically shows an Asphaltene Cracking Advantage (when measured against the prior art commercial control catalyst of Example VII) of 8.5. The asphaltene content of the 1000 F.+ component of the product obtained by using this invention catalyst is 10.36 w % relative to 11.95 wt % for the prior art commercial control catalyst.

The process of this invention typically shows a Hydrodemetallation Advantage (when measured against the prior art commercial control catalyst of Example VII) of 8.5. The Hydrodemetallation (HDV) Advantage is calculated as the weight % HDV measured for a particular example (X) minus the weight % HDV of a Standard (Y), this difference being divided by the weight % HDV of the Standard.

The asphaltene content of the 1000° F. component of the product obtained by using this invention is 10.36 w %. A typical prior art control catalyst yields 11.95 w % asphaltenes.

EXAMPLE II-VII*

In experimental Example II-III, the catalyst is prepared as in Example I except that it contains different amounts of catalytic metals, different TPV, TSA, and Pore Size Distribution—all as set forth in the Table which follows. Also included are control Examples IV*-VII*. Control Example V* utilizes a commercially available NiMo catalyst (the HDS-1443 B brand of catalyst marketed by Criterion Catalyst Co.).

| | CATALYST PROPERTIES | | | | | | |
|---|---|---|---|---|---|---|---|
| Chem. Com. (wt. %): | I NiMo | II NiMo | III NiMo | VII* NiMo | IV* NiMoP | V* NiMoP | VI* NiMoP |
| MoO$_3$ | 14.5-16.5 | 14.5-16.5 | 14.5-16.5 | 11.5-14.5 | 14.5-15.5 | 14.5-15.5 | 14.5-16.5 |
| NiO | 3.0-3.5 | 3.0-3.5 | 3.0-3.5 | 3.2-4.0 | 3.0-3.5 | 3.0-3.5 | 3.0-3.5 |
| CoO | None | None | None | None | None | None | None |
| SiO$_2$ | ≦2.5 | ≦2.5 | ≦2.5 | ≦1.0 | ≦2.5 | ≦2.5 | ≦2.5 |
| SO$_4$ | ≦0.8 | ≦0.8 | ≦0.8 | ≦0.8 | ≦0.8 | ≦0.8 | ≦0.8 |
| Na$_2$O | ≦0.1 | ≦0.1 | ≦0.1 | ≦0.05 | ≦0.1 | ≦0.1 | ≦0.1 |
| P$_2$O$_5$ | ≦0.2 | ≦0.2 | ≦0.2 | ≦0.2 | 1.5.-1.9 | ≦0.2 | 1.6 |
| Surface Area (m$^2$/g) | 209 | 190 | 170 | 314 | 182 | 194 | 269 |
| TPV (cc/g)* | 0.77 | 0.79 | 0.80 | 0.74 | 0.69 | 0.64 | 0.71 |
| PV < 80Å (% TPV)* | 1.9 | 0.7 | 0.3 | 53.3 | 2.1 | 1.3 | 33.9 |
| Median PD by Vol., Å* | 122 | 135 | 146 | 73 | 130 | 126 | 89 |
| Micropore Mode (dV/dD)$_{MAX}$, Å* | 105 | 121 | 131 | 50 | 121 | 116 | 80 |
| PV dV/dD$_{MAX}$ ± 20Å (% PV < 250Å)* | 68.1 | 67.8 | 66.3 | 72.2 | 68.9 | 65.2 | 70.2 |
| PV > 250Å (% TPV)* | 25.9 | 27.8 | 28.1 | 34.1 | 15.5 | 7.3 | 15.8 |
| PV > 160Å (% TPV)* | 32.3 | 36.2 | 40.1 | 37.4 | 23.2 | 16.3 | 20.6 |
| PV 500Å-10,000Å (% TPV)* | 21.8 | 23.3 | 22.9 | 29 | 10.2 | 3.5 | 11.3 |

*Pore Structure information determined using Micromeretics Autopore 9220 mercury porosimetry instrument.

TABLE

Average Advantage for Hydrodemetallation (%) (from 0.1 to 3.0 Barrels per Pound Catalyst Age)

| Catalyst | HDV* | HDNi** |
|---|---|---|
| Example I | +2.2 | +9.5 |
| Example VII* | Base = 0 | Base = 0 |
| Example IV* | −5.0 | +3.6 |
| Example V* | −4.2 | +6.7 |
| Example VI* | −10.3 | −3.2 |

* $\frac{\text{Wt \% HDV Measured} - \text{Wt \% HDV Standard}}{\text{Wt \% HDV Standard}}$

** $\frac{\text{Wt \% HDNi Measured} - \text{Wt \% HDNi Standard}}{\text{Wt \% HDNi Standard}}$ From the above Table, it is apparent that the process of this invention shows higher levels of vanadium and nickel removal than the control examples.

TABLE

Average Catalytic Activites (Wt. %) (from 0.1 to 3.0 Barrels per Pound Catalyst Age)

| | Catalyst | | | | |
|---|---|---|---|---|---|
| | Example I | Example VII* | Example IV* | Example V* | Example VI* |
| % Sulfur Removal | 62.8 | 57.7 | 63.8 | 67.3 | 64.0 |
| % Carbon Residue Reduction* | 45.0 | 40.0 | 45.8 | 48.0 | 49.0 |
| % Nickel Removal | 54.1 | 49.4 | 51.2 | 52.7 | 47.8 |
| % Vanadium Removal | 75.4 | 73.8 | 70.1 | 70.7 | 66.2 |
| % Hydroconversion of 1000° F.+ to 1000° F.− Materials** | 40.2 | 41.2 | 41.0 | 41.6 | 44.9 |
| % Hydroconversion Advantage*** | −2.5 | Base = 0 | −0.5 | +1.0 | +9.0 |

*As measured with an Alcor micro-carbon residue tester.
**Average from 0.1 to approximately 4.0 barrels per pound catalyst age.
*** $\frac{\text{Wt \% 1000° F.+ Conversion Measured} - \text{Wt \% 1000° F.+ Conversion Standard}}{\text{Wt \% 1000° F.+ Conversion Standard}}$ The Hydrodemetallation Advantage calculated for Examples I, IV, V and VII* is:

TABLE

| | Hydrodemetallation Advantage | |
|---|---|---|
| Example | HDV | HDNi |
| I | +2.2 | +9.4 |
| IV* | −5.0 | +3.6 |
| V* | −4.2 | +6.7 |
| VI* | −10.3 | −3.2 |
| VII* (Control) | 0 | 0 |

The Average Catalytic Activity in weight % is determined over the age range of 0.1–3.0 barrels per pound.

TABLE

| | Example | | | | |
|---|---|---|---|---|---|
| Property | I | IV* | V* | VI* | VII* |
| % S Removal | 63 | 64 | 67 | 64 | 58% |
| Carbon Residue Reduction | 45 | 46 | 48 | 49 | 40 |
| % Ni Removal | 54 | 51 | 53 | 48 | 49 |
| % V Removal | 75 | 70 | 71 | 66 | 74 |
| % Hydroconversion °F. 1000° F.+ to 1000° F. Materials | 40.2 | 41 | 41.6 | 44.9 | 41.2 |
| Hydroconversion Advantage | −2.5 | −0.5 | 1.0 | +9.0 | 0 |

TABLE

Average Product Quality Parameters (from 0.1 to Approximately 4.0 Barrels per Pound Catalyst Age)

| | Catalyst | | | | |
|---|---|---|---|---|---|
| | Example I | Example VII* | Example IV* | Example V* | Example VI* |
| Initial Boiling Point - 650° F. | | | | | |
| Specific Gravity (g/cc) | 0.85 | 0.85 | 0.85 | 0.85 | 0.85 |
| Sulfur (Wt. %) | 0.25 | 0.34 | 0.25 | 0.18 | 0.23 |
| 650° F.–1000° F. | | | | | |
| Specific Gravity (g/cc) | 0.93 | 0.94 | 0.93 | 0.93 | 0.93 |
| Sulfur (Wt. %) | 1.05 | 1.26 | 0.94 | 0.73 | 0.80 |
| 1000° F.+ | | | | | |
| Specific Gravity (g/cc) | 1.03 | 1.04 | 1.03 | 1.03 | 1.03 |
| Sulfur (Wt. %) | 3.07 | 3.42 | 3.11 | 2.86 | 3.32 |
| Asphaltenes (Wt. %) | 10.4 | 12.0 | 12.0 | 11.4 | 14.0 |

From the above Tables, the following conclusions may be drawn:

(i) The catalysts of Examples I–II of this invention permit attainment of desirable results when used in hydrodesulfurization and asphaltene conversion;

(ii) the process of the instant invention permits a high level of denickelization (HDNi) of the charge;

(iii) the process of the instant invention permits a high level of asphaltene cracking conversion.

(iv) the process of the instant invention permits a high level of hydro demetallation (HDM) of the charge;

(v) the process of the instant invention permits a high level of carbon residue reduction (CCR); and (vi) the process of the instant invention permits conversion of feedstock components having a boiling point above about 1000° F. to product components having a boiling point less than 1000° F.;

Although this invention has been illustrated by reference to specific embodiments, it will be apparent to those skilled in the art that various charges and modifications may be made which clearly fall within the scope of the invention.

We claim:

1. A catalyst comprising a porous alumina support bearing 3.0–3.5% NiO, 14.5–16.5 $MoO_3$, and <0.2 w % of $P_2O_5$, said catalyst having a Total Surface Area of 165–230 m$^2$/g, a Total Pore Volume of 0.73–0.8 cc/g, and a Pore Diameter Distribution whereby 0–3% of the Total Pore Volume is present as primary micropores of diameter less than about 80 Å, and secondary micropores having diameters ±20 Å of a Pore Mode of 105–125 Å are present in amount of at least about 65% of the micropore volume having pores with diameter less than 250 Å, and 25–29% of the Total Pore Volume is present as macropores of diameter greater than about 250 Å.

2. A catalyst comprising a porous alumina support bearing 3.0–3.5 w % of a Group VIII metal oxide, 14.5–16.5 w % of a Group VI-B metal oxide, and less than 0.2% of a phosphorus oxide, said catalyst having a Total Surface Area of 195–215 m$^2$/g, a Total Pore Volume of 0.73–0.8 cc/g, and a Pore Diameter Distribution whereby less than 3% of the Total Pore Volume is present as primary micropores of diameter $\leq 80$ Å, and secondary micropores of diameters $\pm 20$ Å of a pore mode of 100–135 Å are present in amount of at least about 65% of the micropore volume having pores with diameter less than 250 Å, and 25–29% of the Total Pore Volume is present as macropores of diameter $>250$ Å.

3. A catalyst as claimed in claim 2 wherein said Group VIII metal is present in amount of about 3.0 w % as an oxide.

4. A catalyst as claimed in claim 2 wherein said Group VI-B metal is present in amount of about 15 w % as an oxide.

5. A catalyst as claimed in claim 2 wherein said phosphorus oxide is present in amount of <0.2 w % as an oxide.

* * * * *

UNITED STATES PATENT AND TRADEMARK OFFICE
CERTIFICATE OF CORRECTION

PATENT NO. : 5,416,054
DATED : May 16, 1995
INVENTOR(S) : Pei-Shing Eugene Dai, et. al.

It is certified that error appears in the above-indentified patent and that said Letters Patent is hereby corrected as shown below:

Column 13:
In Claim 2, line 4, delete "$\leqq 80\text{Å}$" and insert therefor

-- $\leq 80\text{Å}$ --.

Column 13:
In Claim 2, line 10 delete "$>250\text{Å}$" and insert therefor

-- $\geq 250\text{Å}$ --.

Signed and Sealed this

Twelfth Day of September, 1995

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,416,054
DATED : May 16, 1995
INVENTOR(S) : Dai et al.

It is certified that error appears in the above-indentified patent and that said Letters Patent is hereby corrected as shown below:

In the Abstract, line 9, delete "+20" and insert -- ±20 --.

Column 2, line 37, delete "50A" and insert --150A°--.

Column 5, line 9, delete "≥25" and insert --≥250 --.

Column 7, line 29, delete " forman " and insert --form an--.

Column 13, line 10, delete ">250 " and insert --≥ 250--.

Signed and Sealed this

Twenty-seventh Day of February, 1996

Attest:

BRUCE LEHMAN

Attesting Officer   Commissioner of Patents and Trademarks